(12) United States Patent
Gil et al.

(10) Patent No.: US 9,894,658 B2
(45) Date of Patent: Feb. 13, 2018

(54) JOINT PATTERN BEAM SECTORIZATION METHOD AND APPARATUSES PERFORMING THE SAME

(71) Applicant: Korea Advanced Institute of Science and Technology, Daejeon (KR)

(72) Inventors: Gye Tae Gil, Daejeon (KR); Ju Yong Lee, Daejeon (KR); Dong Ho Cho, Seoul (KR); Dae Hee Park, Daejeon (KR); Chang Bae Yoon, Daejeon (KR); Sang Min Oh, Daejeon (KR); Han Young Yim, Daejeon (KR); Yong Hoon Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 61 days.

(21) Appl. No.: 14/885,699

(22) Filed: Oct. 16, 2015

(65) Prior Publication Data
US 2016/0219567 A1 Jul. 28, 2016

(30) Foreign Application Priority Data

Jan. 22, 2015 (KR) .................. 10-2015-0010822

(51) Int. Cl.
*H04W 72/04* (2009.01)
*H04B 7/04* (2017.01)
(Continued)

(52) U.S. Cl.
CPC ........ *H04W 72/046* (2013.01); *H04B 7/0491* (2013.01); *H04B 7/0617* (2013.01)

(58) Field of Classification Search
CPC .. H04W 72/046; H04B 7/0491; H04B 7/0413
See application file for complete search history.

(56) References Cited

U.S. PATENT DOCUMENTS 7,280,848 B2 * 10/2007 Hoppenstein .......... H01Q 1/246
455/114.3
7,920,646 B2 * 4/2011 Yeh ...................... H04B 7/0634
375/299

(Continued)

FOREIGN PATENT DOCUMENTS

JP 2014-027608 A 2/2014
KR 10-2007-0053812 A 5/2007
(Continued)

OTHER PUBLICATIONS

International Search Report, PCT/KR2015/000709, dated Jul. 13, 2015, 7 pages.

(Continued)

*Primary Examiner* — Rasheed Gidado
(74) *Attorney, Agent, or Firm* — Dale, Crowley, Mofford & Durkee, LLP

(57) ABSTRACT

Provided is a joint pattern beam sectorization method and apparatuses for performing the same, wherein the joint pattern beam sectorization method including generating, in a service target region, a pattern sector corresponding to an antenna array including antennas having an identical radiation pattern by using the antenna array and generating pattern beam sectors in the pattern sector through a beamforming using the antennas.

6 Claims, 13 Drawing Sheets

(51) Int. Cl.
*H04B 7/0491* (2017.01)
*H04B 7/06* (2006.01)

(56) References Cited

U.S. PATENT DOCUMENTS

| | | | | |
|---|---|---|---|---|
| 8,165,595 B2* | 4/2012 | Xia | ............ | H04B 7/0617 |
| | | | | 455/452.2 |
| 8,665,846 B2* | 3/2014 | O'Keefe | ............ | H04B 7/0408 |
| | | | | 370/338 |
| 2002/0068613 A1* | 6/2002 | Miyano | ............ | H01Q 1/246 |
| | | | | 455/562.1 |
| 2003/0146876 A1* | 8/2003 | Greer | ............ | H01Q 7/00 |
| | | | | 343/702 |
| 2010/0048220 A1* | 2/2010 | Taira | ............ | H04B 7/024 |
| | | | | 455/450 |
| 2011/0095961 A1* | 4/2011 | Johansson | ............ | H01Q 1/246 |
| | | | | 343/893 |
| 2014/0055302 A1* | 2/2014 | Jia | ............ | H01Q 3/34 |
| | | | | 342/372 |
| 2014/0321375 A1* | 10/2014 | Agiwal | ............ | H04W 56/001 |
| | | | | 370/329 |

FOREIGN PATENT DOCUMENTS

| | | |
|---|---|---|
| KR | 10-2007-0058005 A | 6/2007 |
| KR | 2008-0030495 A | 4/2008 |
| KR | 10-2011-0008704 A | 1/2011 |
| KR | 2013-0094177 A | 8/2013 |

OTHER PUBLICATIONS

Korean Notice of Allowance, Application No. 057834403, dated Aug. 25, 2015, 6 pages.
Korean Office Action, Appiication No. 04035 1892, dated Jun. 17, 2015, 6 pages with English translation.

* cited by examiner

FIG. 5
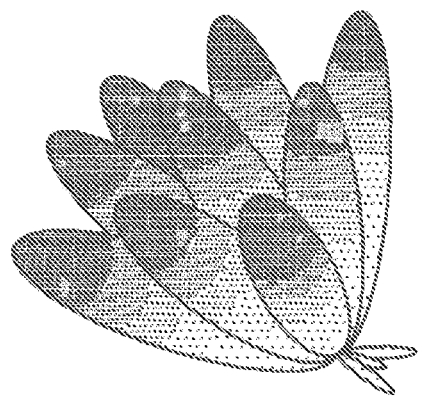
Pattern sector 1
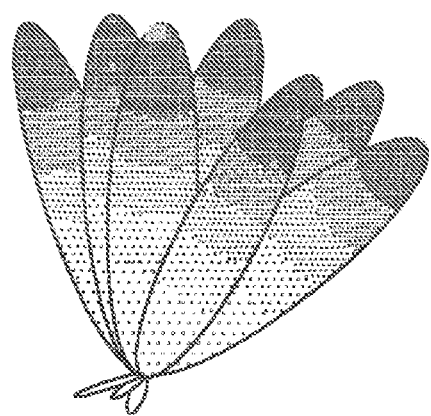
Pattern sector 2
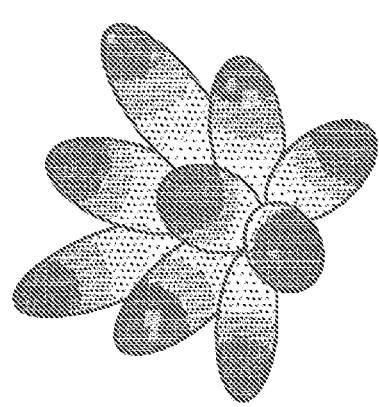
Pattern sector 3
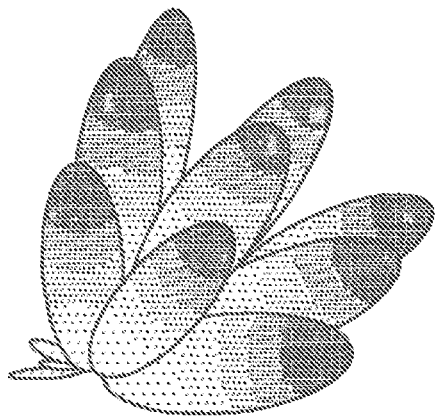
Pattern sector 4

FIG. 10
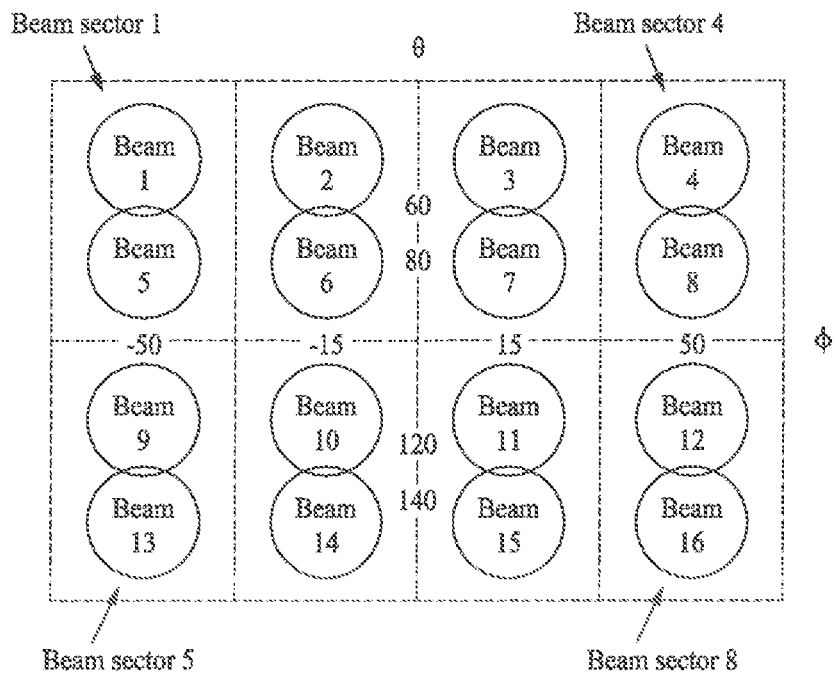
Related BDMA technology
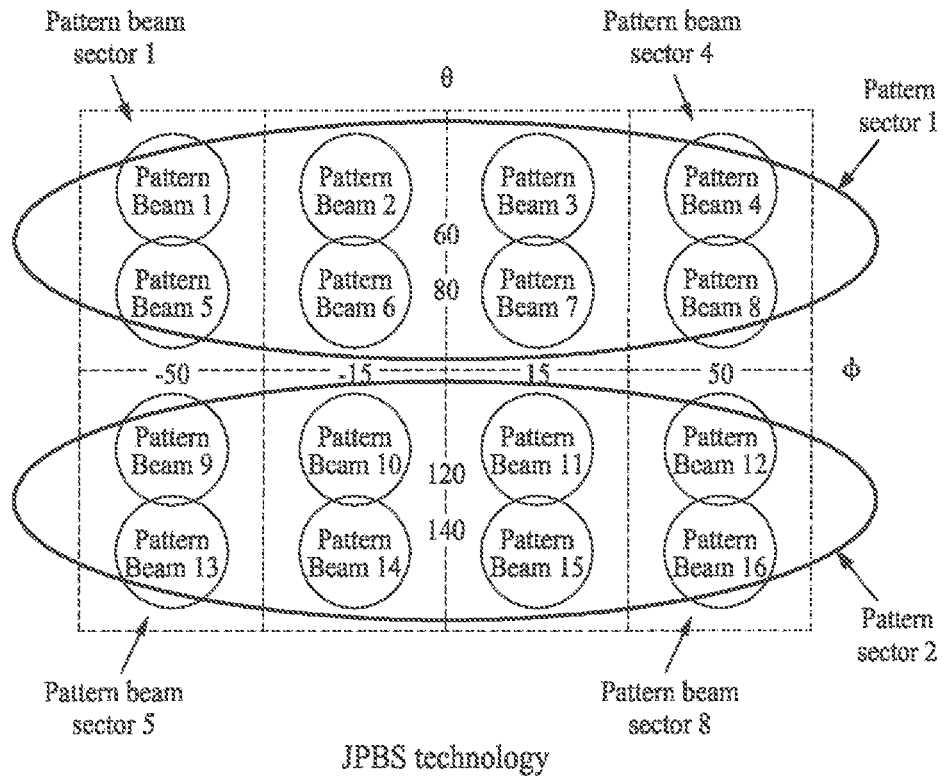
JPBS technology

JOINT PATTERN BEAM SECTORIZATION METHOD AND APPARATUSES PERFORMING THE SAME

CROSS-REFERENCE TO RELATED APPLICATION

This application claims the priority benefit of Korean Patent Application No. 10-2015-0010822, filed on Jan. 22, 2015, in the Korean Intellectual Property Office, the disclosure of which is incorporated herein by reference.

BACKGROUND

1. Field of the Invention

Example embodiments of the present invention relate to a joint pattern beam sectorization method and apparatuses performing the same.

2. Description of the Related Art

Massive multiple-input and multiple-output (MIMO) communication technology may be wireless transmission technology using a large number of antennas in a base station or a repeater. In the massive MIMO communication technology, interference between user equipment (UE) signals may be spatially controlled through the same beamforming. Thus, the large number of UEs may be simultaneously served using the same amount of wireless resources, and power consumption per UE may be reduced by an inverse number of the number of antennas.

Based on the above technology, the beamforming may be applied for each of the UEs in a wide service target region, for example, three sectors in general. In this example, to implement the technology based on a frequency division duplex (FDD) scheme, massive MIMO channel state information (CSI) may be estimated in the UE and transmitted to a base station as a feedback such that the base station determines a beamforming weight based on the massive MIMO CSI. For this reason, such a large amount of feedback may be an issue to be solved to implement the technology. When the number of massive antennas is M, and when the number of UEs having a single antenna is K, M*K CSI feedbacks may be used in typical sectorization technology. Here, M is an integer greater than K.

To solve the issue, a sector of the typical 3-sector system may be divided into a plurality of beam sectors, and beam division multiple access (BDMA) technology and joint space division and multiplexing (JSDM) technology may be suggested as typical MU-MIMO communication technology in the beam sector.

When the number of beam sectors is B, beamforming of the massive MIMO communication system may be performed using B×(K/B*K/B)=(K/B)*K CSI feedbacks based on the BDMA technology and the JSDM technology. Thus, an amount of CSI feedbacks may be reduced by M/(K/B) times when compared to the typical system.

The BDMA technology and the JSDM technology may be effectively used to reduce the amount of CSI feedbacks by dividing an entire service target region into beam sectors.

A massive antenna array may occupy a large space to implement the BDMA technology and the JSDM technology in a cellular band. For example, at least an area corresponding to a value of Nr*Nc*(λ/2)2 may be used to implement a multiple beam sector or multiple beam employing the massive antenna array as a planar array having Nr*Nc elements. Also, planar arrays corresponding to the number of MIMO transmission antennas may be necessary to apply the MIMO communication technology for each of the beam sectors.

SUMMARY

According to an aspect of the present invention, there is provided a joint pattern beam sectorization method including generating, in a service target region, a pattern sector corresponding to an antenna array including antennas by using the antenna array, and generating pattern beam sectors in the pattern sector through a beamforming using the antennas.

The antennas may be disposed at a predetermined interval.

The predetermined interval may be λ/2.

The generating of the pattern beam sectors may include generating output signals to be transmitted to the pattern beam sectors through a beamforming of input signals and transmitting the output signals to the pattern beam sectors using the antennas.

Each of the antennas may have an identical radiation pattern.

According to another aspect of the present invention, there is also provided a joint pattern beam sectorization method including generating, in a service target region, a pattern sector corresponding to a first antenna array of a first pattern antenna and a second antenna array of a second pattern antenna by using the first antenna array and the second antenna array, and generating an identical pattern beam sector in the pattern sector through a beamforming using antennas included in the first antenna array and the second antenna array.

Each of the antennas may have an identical radiation pattern.

A distance between the first pattern antenna and the second pattern antenna may be greater than λ/2.

Each of the antennas may be a polarization antenna.

A distance between the first pattern antenna and the second pattern antenna may be less than λ/2.

According to still another aspect of the present invention, there is also provided a pattern antenna including a first antenna array including first antennas having a first radiation pattern, and a second antenna array including second antennas having a second radiation pattern, wherein the first antennas are disposed at a first interval and the second antennas are disposed at a second interval such that each of the first antennas is grouped with each of the second antennas.

The first interval may be the same as the second interval.

The first interval and the second interval may be λ/2.

Each of the first antennas and second antennas may be a polarization antenna.

According to still another aspect of the present invention, there is also provided a communication apparatus including a pattern antenna including an antenna array, and a beamformer to generate pattern beam sectors in a pattern sector corresponding to the antenna array generated in a service target region through a beamforming using antennas included in the antenna array.

The beamformer may generate output signals to be transmitted to the pattern beam sectors through a beamforming of input signals, and transmit the output signals to the pattern beam sectors using the antennas.

Each of the antennas may have an identical radiation pattern.

The antennas may be disposed at a predetermined interval.

The predetermined interval may be λ/2.

According to yet another aspect of the present invention, there is also provided a communication apparatus including a pattern antenna including antenna arrays and a beamformer to divide, into pattern beam sectors, each of pattern sectors corresponding to each of the antenna arrays generated in a service target region through a beamforming using antennas included in each of the antenna arrays.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5 illustrates an example of pattern beam sectors generated using the pattern antenna of FIG. 2;

FIG. 10 illustrates an example of configuring a beam sector based on JPBS technology and related beam division multiple access (BDMA) technology;

DETAILED DESCRIPTION

Figure 1:
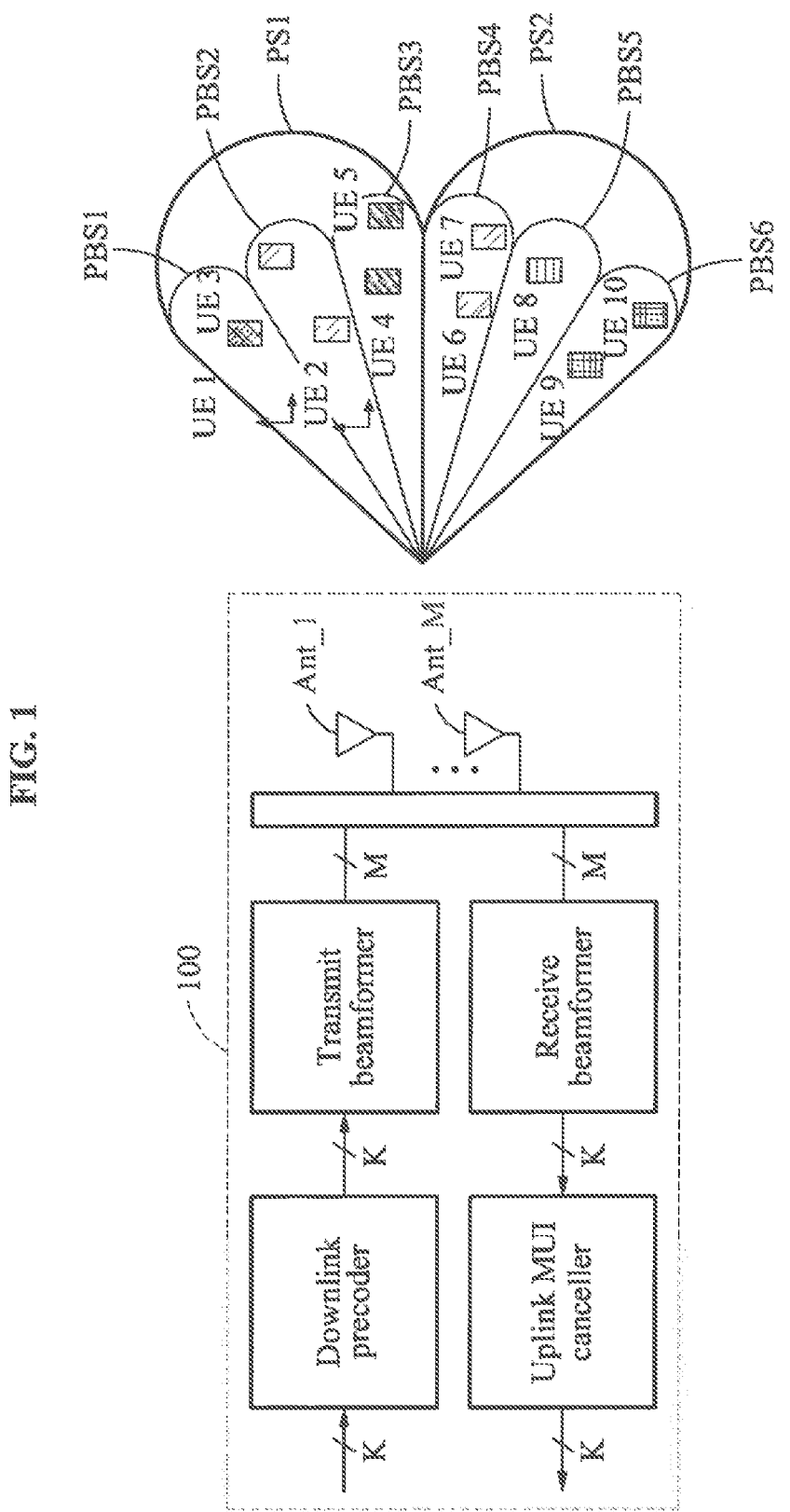
FIG. 1 illustrates an example of a space division method.

Example embodiments will now be described more fully with reference to the accompanying drawings in which example embodiments are shown. Example embodiments, may, however, be embodied in many different forms and should not be construed as being limited to the embodiments set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described in detail with reference to the accompanying drawings.

FIG. 1 illustrates an example of a space division method.

Referring to FIG. 1, a communication apparatus 100 may be a base station corresponding to a stationary spot communicating with terminals UE1 through UE10 in general. The communication apparatus 100 may also be referred to as, for example, a Node B, an evolved node B (eNodeB), a base transceiver system (BTS), and an access point.

The terminals UE1 through UE10 may also be referred to as, for example, user equipment (UE), a mobile station (MS), a mobile terminal (MT), a user terminal (UT), a wireless terminal, an access terminal (AT), a subscriber unit, a subscriber station (SS), a wireless device, a wireless communication apparatus, a wireless transmit/receive unit (WTRU), a mobile node, and a mobile.

The communication apparatus 100 may generate pattern sectors, for example, a first pattern sector PS1 and a second pattern sector PS2, in a service target region using antenna arrays including antennas or antenna elements, each having a different radiation pattern. Concisely, the communication apparatus 100 may divide the service target region into the pattern sectors. In this example, each of pattern antennas Ant_1 through Ant_M, M being a natural number greater than "1", may include antenna arrays. The service target region may be, for example, a region including the terminals UE1 through UE10 capable of receiving a service from the communication apparatus 100 or communicating with the communication apparatus 100.

In an example, the communication apparatus 100 may divide the service target region into the first pattern sector PS1 and the second pattern sector PS2. Here, the first pattern sector PS1 may correspond to a first antenna array including first antennas having a first radiation pattern, and the second pattern sector PS2 may correspond to a second antenna array including second antennas having a second radiation pattern. The first radiation pattern may differ from the second radiation pattern. The first pattern sector PS1 may be located adjacent to the second pattern sector PS2.

Also, the communication apparatus 100 may generate pattern beam sectors PBS1 through PBS6 in the pattern sectors through a beamforming using the antenna array. For example, the communication apparatus 100 may divide the first pattern sector PS1 and the second pattern sector PS2 into the pattern beam sectors PBS1 through PBS6.

In an example, the communication apparatus 100 may divide the first pattern sector PS1 into the pattern beam sectors PBS1 through PBS3 through the beamforming using the first antennas included in the first antenna arrays. The communication apparatus 100 may divide the second pattern sector PS2 into the pattern beam sectors PBS4 through PBS6 through the beamforming using the second antennas included in the second antenna array.

At least one pattern beam sector, for example, the pattern beam sector PBS3, included in the first pattern sector PS1 may not overlap with at least one pattern beam sector, for example, the pattern beam sector PBS4, included in the second pattern sector PS2.

As illustrated in FIG. 1, the first pattern sector PS1 may be located adjacent to the second pattern sector PS2. Also, the at least one pattern beam sector of the first pattern sector PS1 may be located adjacent to the at least one pattern beam sector of the second pattern sector PS2. When the beamforming is performed by limiting an antenna radiation angle using a high directivity pattern antenna, a probability that interference occurs in pattern beam sectors, for example, the pattern beam sectors PBS3 and PBS4, included in neighboring pattern sectors, for example, the first pattern sector PS1 and the second pattern sector PS2, may be reduced. Thus, channel capacity gain may be improved by preventing an overlap between the pattern beam sectors of the neighboring pattern sectors.

The communication apparatus 100 may classify the service target region into the pattern beam sectors PBS1 through PBS6.

The communication apparatus 100 may transmit a pattern beam identification (PBID) in lieu of a typical cell identification (ID). The PBID may correspond to a base station ID (BSID) of a long-term evolution (LTE) communication. Thus, the PBID may be incorporated in a secondary synchronization symbol (SSS) of a downlink frame so as to be received by all terminal devices in a corresponding pattern beam sector.

Since the PBID being received by a terminal device is identifiable, the terminal device may provide channel state information (CSI) on a baseband effective channel as a feedback in lieu of typical CSI.

The present disclosure may be implemented by adding a circuit to control a beamformer factor and changing the BSID to the PBID in the current LTE standard and thus, may have a significantly small technical dependency on a baseband standard.

For each of the pattern beam sectors PBS1 through PBS6, the communication apparatus 100 may perform an MU-MIMO precoding to control interference of terminal devices included in the same pattern beam sector in a downlink communication, and may use a multi-user interference canceller to cancel the interference of the terminal devices in an uplink communication.

In the present disclosure, a method of combining a pattern antenna with beamforming technology to realize space division transmission in a service target region may also be referred to as, for example, joint pattern beam sectorization (JPBS) technology.

Figure 2:
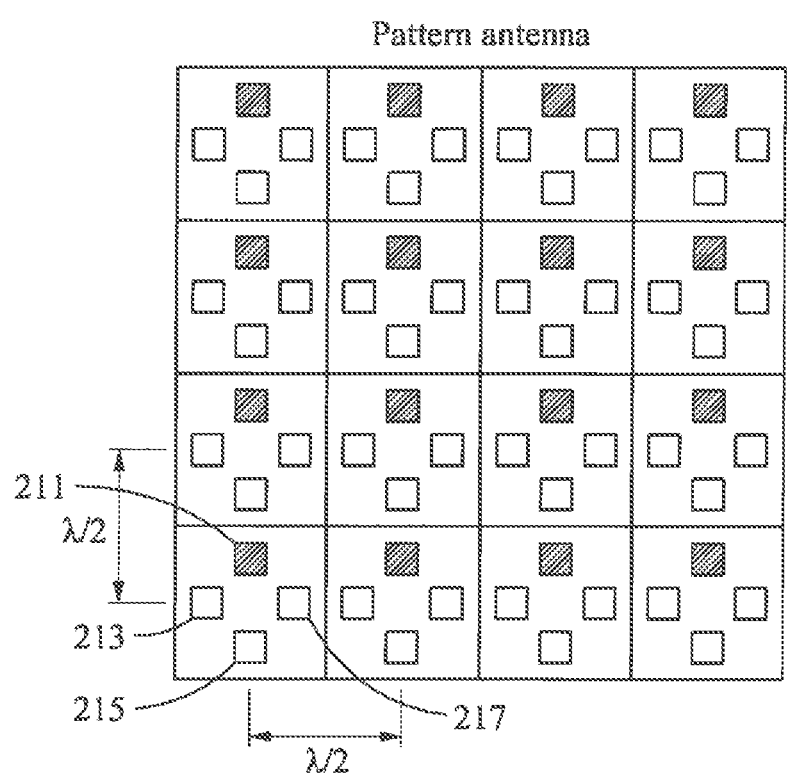
FIG. 2 illustrates an example of a pattern antenna of FIG. 1.
Figure 3:
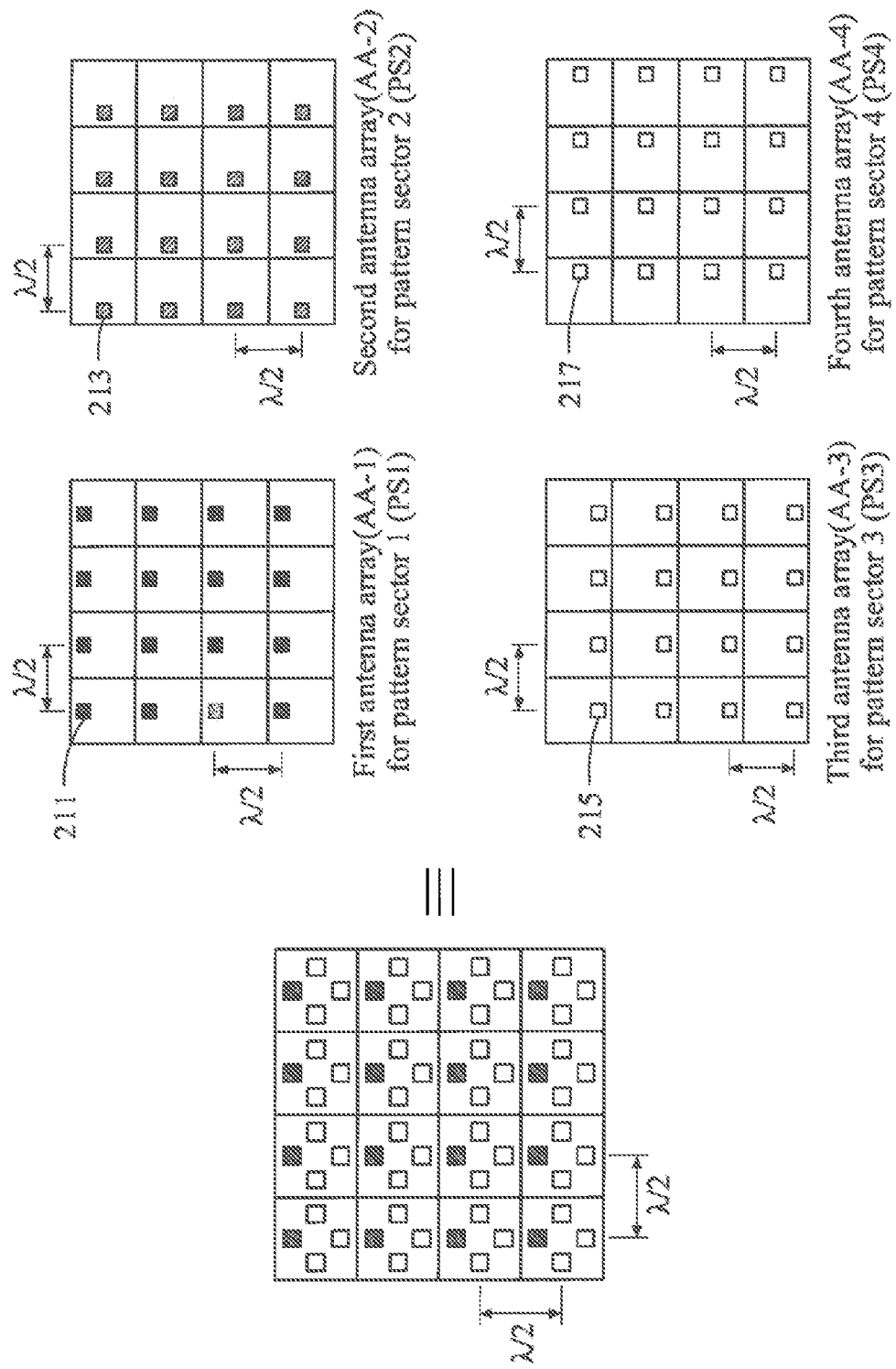
FIG. 3 illustrates an example of a method of generating pattern sectors using antenna arrays included in a pattern antenna.
Figure 4:
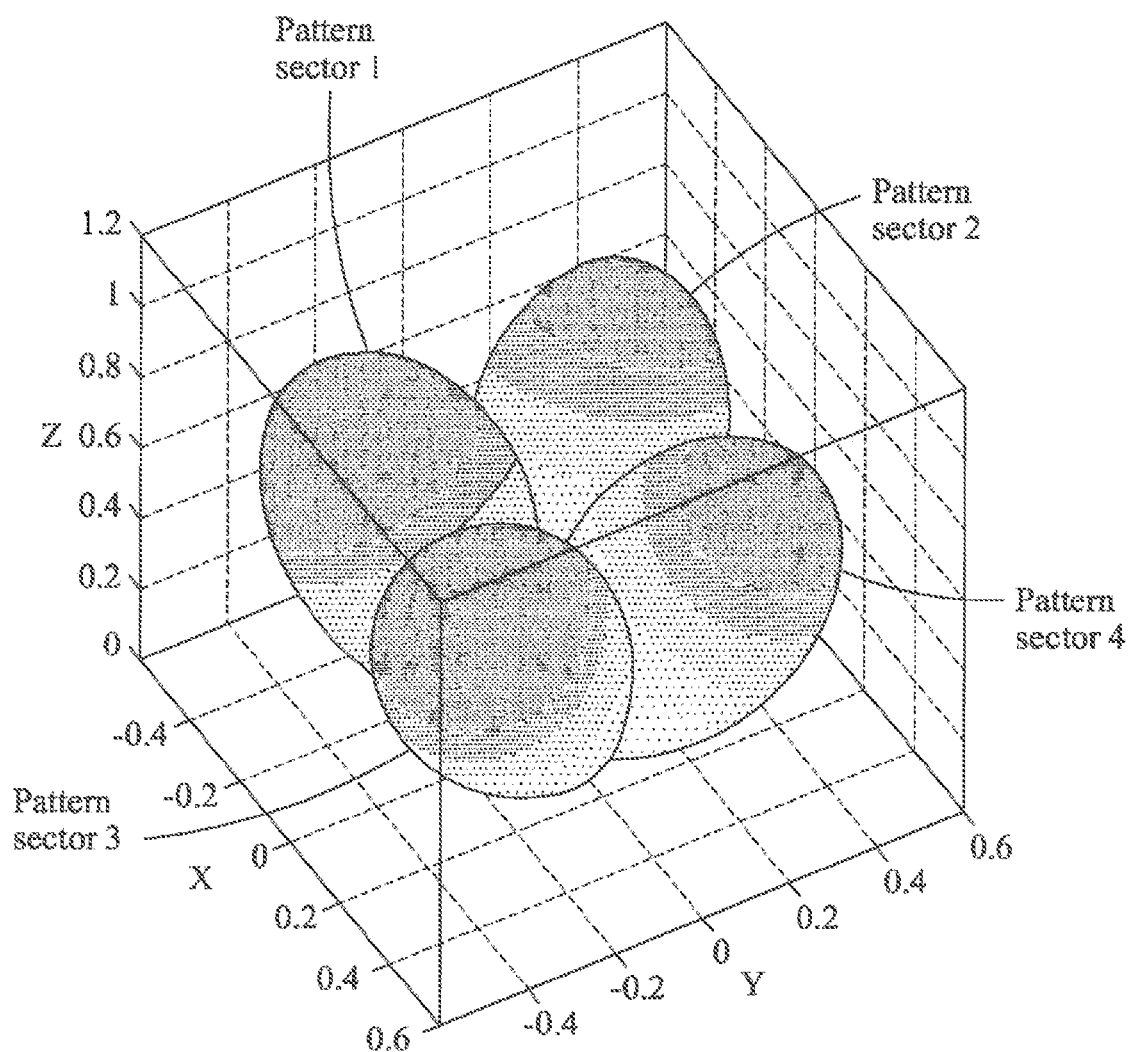
FIG. 4 illustrates an example of pattern sectors generated using the pattern antenna of FIG. 2.

FIG. 2 illustrates an example of the pattern antenna of FIG. 1. FIG. 3 illustrates an example of a method of generating pattern sectors using antenna arrays included in a pattern antenna. FIG. 4 illustrates an example of pattern sectors generated using the pattern antenna of FIG. 2. FIG. 5 illustrates an example of pattern beam sectors generated using the pattern antenna of FIG. 2.

Referring to FIGS. 2 through 5, the pattern antenna may include groups arranged in a vertical direction and groups arranged in a horizontal direction, and each of the groups may include antennas having Np different radiation patterns. A number of the groups arranged in the vertical direction is denoted by Nv, a number of the groups arranged in the horizontal direction is denoted by Nh, and Np denotes a number of the radiation patterns. For increased conciseness and convenience, descriptions will be provided based on an example in which Np is set to "4" with reference to FIGS. 2 through 5.

The pattern antenna may include a plurality of antenna arrays including a first antenna array AA_1, a second antenna array AA_2, a third antenna array AA_3, and a fourth antenna array AA_4. As an example, the first antenna array AA_1 may include first antennas 211 having a first radiation pattern. The second antenna array AA_2 may include second antennas 213 having a second radiation pattern. The third antenna array AA_3 may include third antennas 215 having a third radiation pattern. The fourth antenna array AA_4 may include fourth antennas 217 having a fourth radiation pattern.

The first radiation pattern, the second radiation pattern, the third radiation pattern, and the fourth radiation pattern may differ from one another.

The first antenna array AA_1 may correspond to a first pattern sector PS1. The first antennas 211 of the first antenna array AA_1 may be included in a single first pattern sector PS1. For example, the first pattern sector PS1 may be divided into pattern beam sectors through a beamforming using the first antennas 211. To divide the first pattern sector PS1 into the pattern beam sectors, the first antennas 211 may be arranged regularly at a first interval.

The second antenna array AA_2 may correspond to a second pattern sector PS2. The second antennas 213 of the second antenna array AA_2 may be included in a single second pattern sector PS2. For example, the second pattern sector PS2 may be divided into pattern beam sectors through a beamforming using the second antennas 213. To divide the second pattern sector PS2 into the pattern beam sectors, the second antennas 213 may be arranged regularly at a second interval.

The third antenna array AA_3 may correspond to a third pattern sector PS3. The third antennas 215 of the third antenna array AA_3 may be included in a single third pattern sector PS3. For example, the third pattern sector PS3 may be divided into pattern beam sectors through a beamforming using the third antennas 215. To divide the third pattern sector PS3 into the pattern beam sectors, the third antennas 215 may be arranged regularly at a third interval.

The fourth antenna array AA_4 may correspond to a fourth pattern sector PS4. The fourth antennas 217 of the fourth antenna array AA_4 may be included in a single fourth pattern sector PS4. For example, the fourth pattern sector PS4 may be divided into pattern beam sectors through a beamforming using the fourth antennas 217. To divide the fourth pattern sector PS4 into the pattern beam sectors, the fourth antennas 217 may be arranged regularly at a fourth interval.

As illustrated in FIG. 4, the pattern sectors, for example, the first pattern sector PS1 through the fourth pattern sector PS4, may be generated using the antenna arrays, for example, the first antenna array AA_1 through the fourth antenna array AA_4, each having a different radiation pattern.

As illustrated in FIG. 5, the pattern sectors of FIG. 4 may be divided into a plurality of pattern beam sectors.

Each of the first antennas 211, each of the second antennas 213, each of the third antennas 215, and each of the fourth antennas 217 may be grouped by arranging the first antennas 211 at the first interval, arranging the second antennas 213 at the second interval, arranging the third antennas 215 at the third interval, and arranging the fourth antennas 217 at the fourth interval. In an example, each of the first interval, the second interval, the third interval, and the fourth interval may be a half-wave length, for example, $\lambda/2$.

The present disclosure may provide a pattern antenna array structure to implement an antenna array having Np patterns in an area corresponding to a value of $N_v * N_h * (\lambda/2)^2$. Thus, Np times of pattern beam sectors may be implemented using the same area when compared to a typical antenna array. The foregoing example may indicate that an antenna array space necessary for implementing the same number of beam sectors is to be reduced by 1/Np times.

Each of the antennas, for example, the first antennas 211, the second antennas 213, the third antennas 215, and the fourth antennas 217, may be a polarization antenna.

The antenna array configuring the single pattern sector may also be referred to as, for example, an elementary pattern sector array (EPSA).

Figure 6:
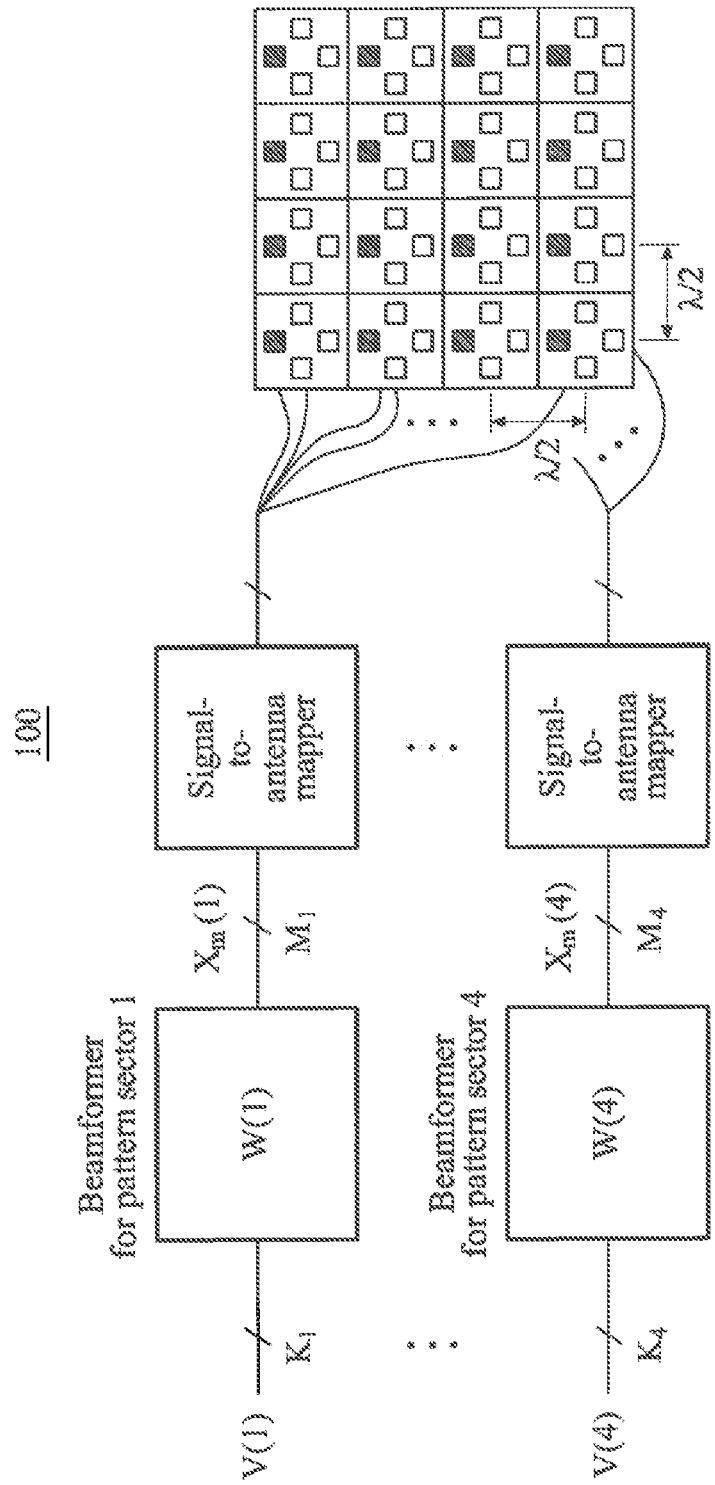
FIG. 6 illustrates an example of an operation of generating a pattern sector.
Figure 7:
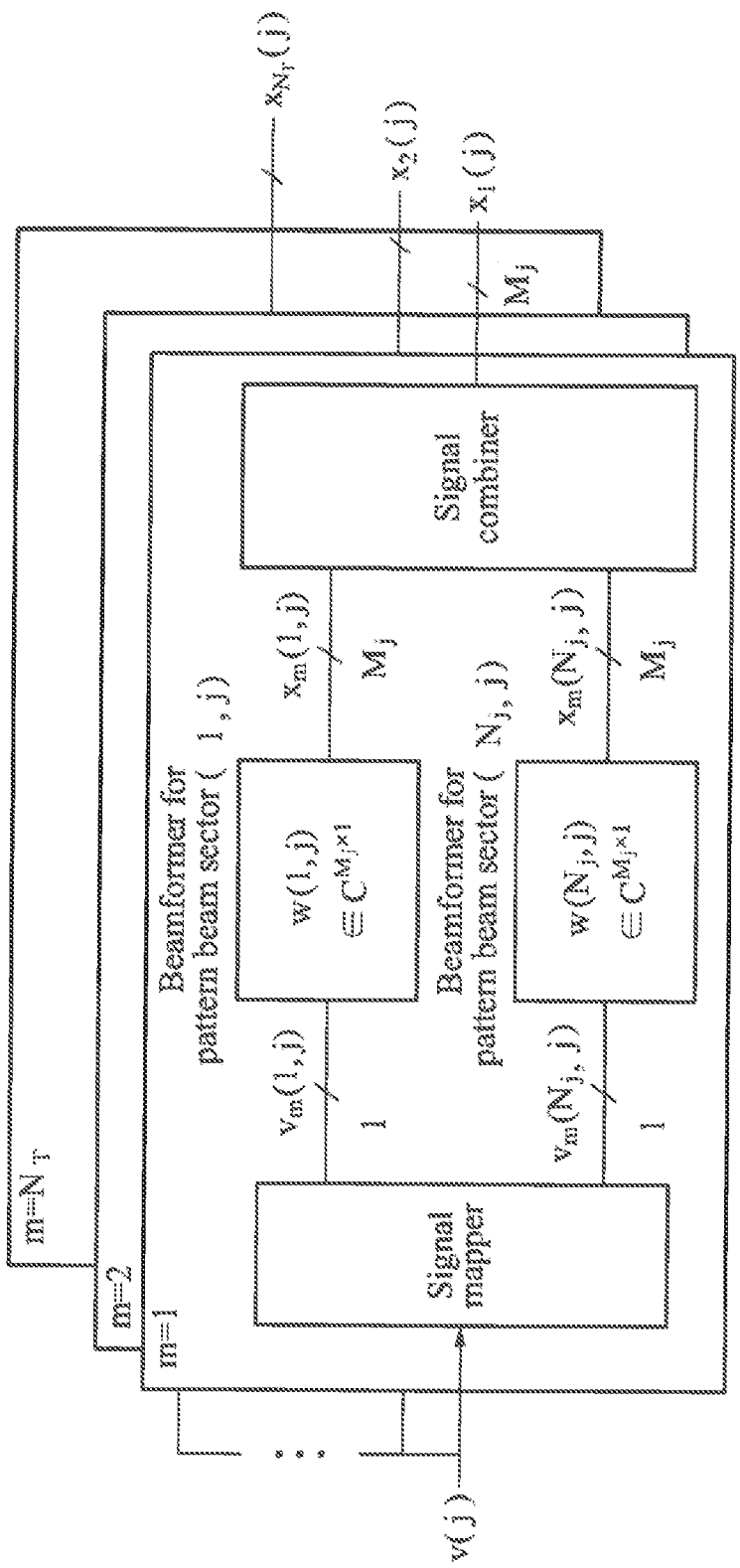
FIG. 7 illustrates an example of an operation of generating a pattern beam sector.

FIG. 6 illustrates an example of an operation of generating a pattern sector. FIG. 7 illustrates an example of an operation of generating a pattern beam sector.

Referring to FIGS. 6 and 7, FIG. 6 illustrates a configuration in which a beamformer and is combined with an antenna to generate a pattern beam sector in the communication apparatus 100. A beamformer module for a pattern sector j as represented by W(j) may perform a beamforming on a signal vector V(j) including $K_j$ signals as elements to output a vector including $M_j$ elements. In this example, the vector may include an output signal $X_m(j)$ as an element, and m is a natural number, for example, 1, 2, or $N_T$. Here, $N_T$ denotes the number of streams transmitted to the pattern sector j. The output signal $X_m(j)$ may be transmitted through an $m^{th}$ EPSA among EPSAs assigned to be used for the pattern sector j.

Although FIG. 6 is implemented for each pattern sector, W(j) may also indicate a beamformer module implementing the pattern sector j and thus, all pattern sectors may be implemented as a single beamformer depending on an example.

Descriptions related to the beamformer module for the pattern sector j will be provided in detail with reference to FIG. 7.

In FIG. 7, w(i, j) may indicate a beamformer weight of an $i^{th}$ pattern beam sector included in the pattern sector j. For example, (i, j) may be used to be an identification number of a pattern beam sector.

A signal mapper may assign signals in the signal vector v(j) to a beamformer input $v_m(i, j)$ for a corresponding pattern beam sector.

A beamformer for a pattern beam sector (i, j) may receive a signal $\{v_m(i, j), m=1, 2, \ldots, N_T\}$ to be transmitted to the pattern beam sector (i, j) as an input using the weight vector w(i, j). Subsequently, the beamformer for the pattern beam sector (i, j) may perform a beamforming on the input to output $\{x_m(i, j), m=1, 2, \ldots, N_T\}$. Through this, $N_T$ symbol streams may be transmitted to the pattern beam sector (i, j). The aforementioned procedure may be performed on all elements, for example, $\{i=1, 2, \text{ or } N_j\}$, and the output signal $X_m(j)$ may be expressed as shown in Equation 1.

$$X_m(j) = \sum_{i=1}^{N_j} X_m(i, j) \quad [\text{Equation 1}]$$

A signal combiner may output the output signal $X_m(j)$ by summing functions of Equation 1, for example, beamformer output $X_m(i, j)$ for each pattern beam sector.

The output signal $X_m(j)$ may be transmitted through an $m^{th}$ EPSA.

Figure 8:
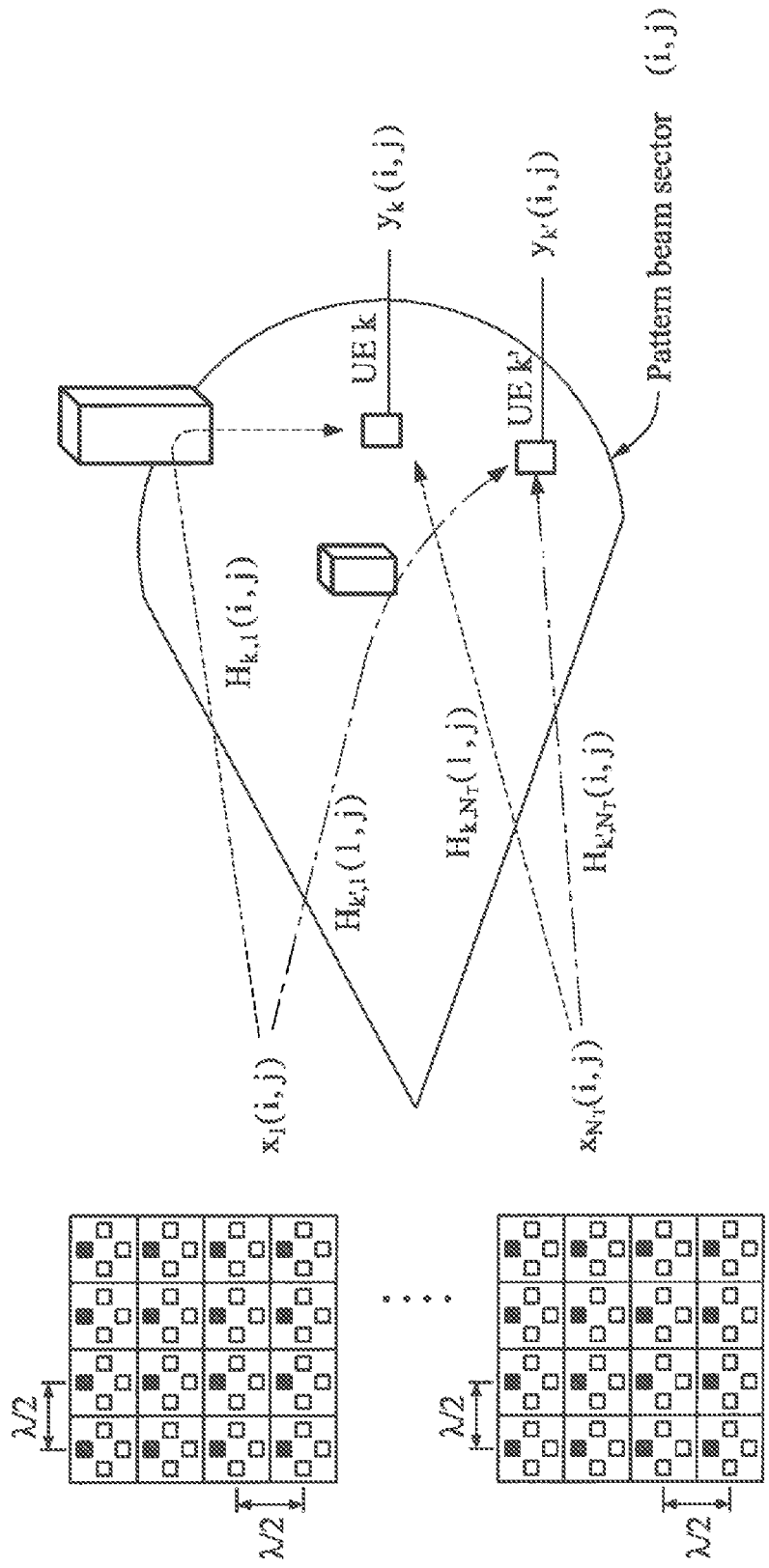
FIG. 8 illustrates an example of a multi-user multiple-input and multiple-output (MU MIMO) communication system using a plurality of pattern antennas.

FIG. 8 illustrates an example of a MU MIMO communication system using a plurality of pattern antennas.

As illustrated in FIG. 8, the MU-MIMO communication system may be provided in a predetermined pattern beam sector (i, j). In an example, at least two EPSAs configuring an identical pattern beam sector may be disposed separate from one another at a distance longer than $\lambda/2$. Also, a different symbol may be transmitted to each of the EPSAs to perform a spatial multiplexing, and an identical symbol may be transmitted to an EPSA for a corresponding pattern beam sector to perform various transmissions. For example, each of the at least two EPSAs may be implemented in a different pattern antenna.

Based on the above configuration, a signal model for performing MU-MIMO transmission and reception in the pattern beam sector (i, j) may be used as follows.

When the vector, for example, $\{X_m(j), m=1, 2, \text{ or } N_T\}$ is transmitted to the pattern beam sector (i, j), a signal $y_k(i, j)$ received by a terminal device UE k included in the pattern beam sector (i, j) may be expressed as shown in Equation 2.

$$\begin{aligned} y_k(i, j) &= \sum_{m=1}^{N_T} H_{k,m}(i, j) X_m(i, j) + n_k(i, j) \\ &= \sum_{m=1}^{N_T} H_{k,m}(i, j) w(i, j) v_m(i, j) + n_k(i, j) \end{aligned} \quad [\text{Equation 2}]$$

In Equation 2, Hk, m(i, j) may be an $N_R*M$ complex matrix, and w(i, j) may be an $M_j*1$ complex vector. By defining a multiplication of a massive MIMO channel to a pattern beam sector beamformer weight as $g_{k,m}(i, j) = H_{k,m}(i, j) w(i, j)$, Equation 2 may also be expressed as shown in Equation 3.

$$y_k(i,j) = \sum_{m=1}^{N_T} g_{k,m}(i,j)v_m(i,j) + n_k(i,j)$$
$$= G_k(i,j)v(i,j) + n_k(i,j)$$

[Equation 3]

Accordingly, an MU-MIMO reception signal may be expressed as shown in Equation 4.

$$\begin{pmatrix} y_k(i,j) \\ y_{k'}(i,j) \end{pmatrix} = \begin{pmatrix} G_k(i,j) \\ G_{k'}(i,j) \end{pmatrix} v(i,j) + \begin{pmatrix} n_k(i,j) \\ n_{k'}(i,j) \end{pmatrix}$$

[Equation 4]

In Equation 4, $G_k(i,j)$ and $v(i,j)$ may be defined as shown in Equations 5 and 6.

$$G_k(i,j) = (g_{k,1}(i,j)g_{k,2}(i,j) \ldots g_{k,N_T}(i,j))$$

[Equation 5]

$$v(i,j) = (v_1(i,j)v_2(i,j) \ldots v_{N_T}(i,j))^T$$

[Equation 6]

Since the MU-MIMO reception signal is expressed by Equation 4, MU-MIMO precoding may be performed by collecting channel information expressed by Equation 5, and signal detection may be performed by applying a signal detection algorithm for each device, for example, UE, based on Equation 3.

Figure 9:
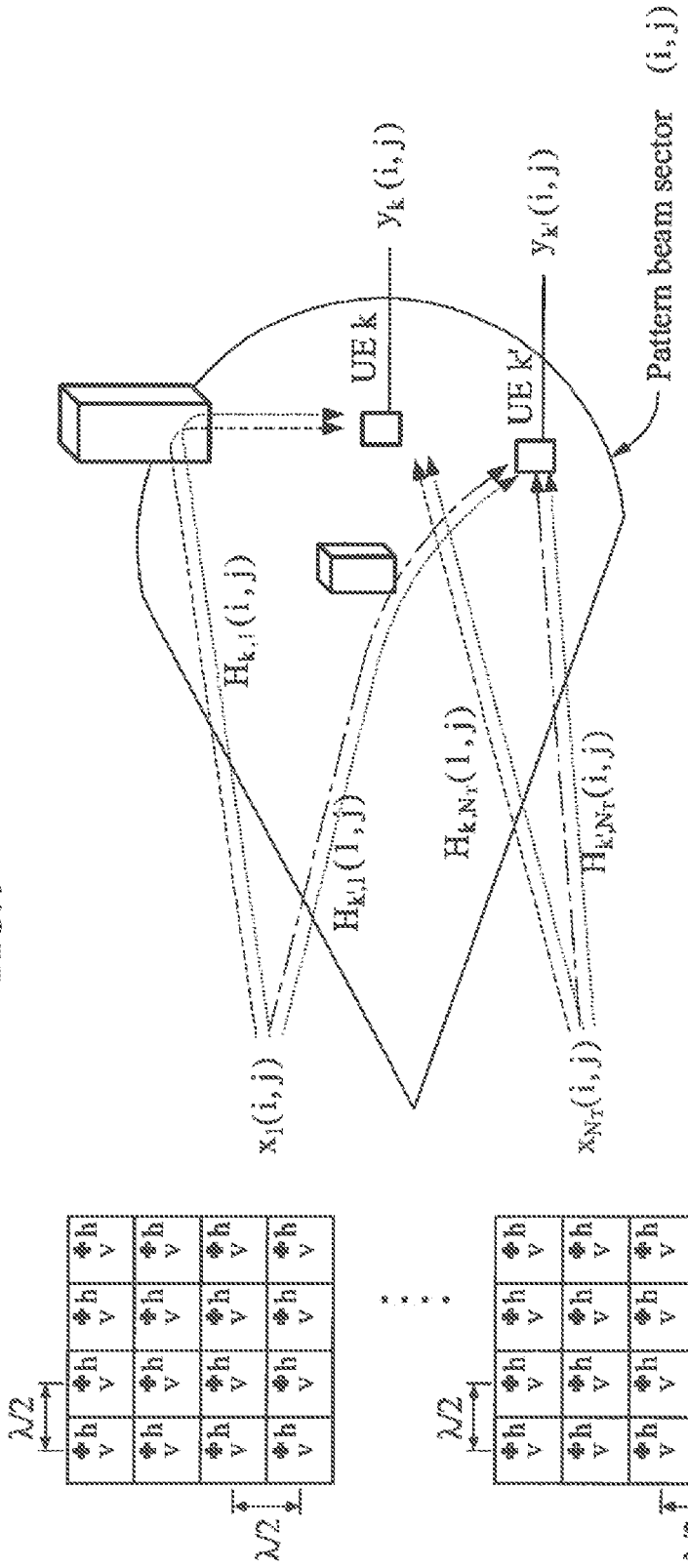
FIG. 9 illustrates another example of a MU MIMO communication system using a plurality of pattern antennas.

FIG. 9 illustrates another example of a MU MIMO system using a plurality of pattern antennas.

As illustrated in FIG. 9, an MU-MIMO system may be provided in a predetermined pattern beam sector (i, j) by implementing antennas included in a plurality of pattern antennas as a polarization antenna.

In an example, an MU-MIMO system for transmitting a plurality of independent symbol streams may be provided by using a plurality of pattern antennas including an EPSA having a vertical polarization and an EPSA having a horizontal polarization for the pattern beam sector (i, j).

As such, a use of the polarization antenna may allow MIMO transmission to be performed without need to arrange two EPSAs to separate from one another at a distance longer than λ/2 and thus, a degree of antenna integration may also be improved.

According to an aspect of the present invention, it is possible to provide technology for performing space division transmission to a service target region by combining a pattern antenna and beamforming technology.

Hereinafter, with reference to FIGS. 10 through 13, performance gain of JPBS technology will be described through a simulation in comparison to related beam division multiple access (BDMA) technology.

Figure 11:
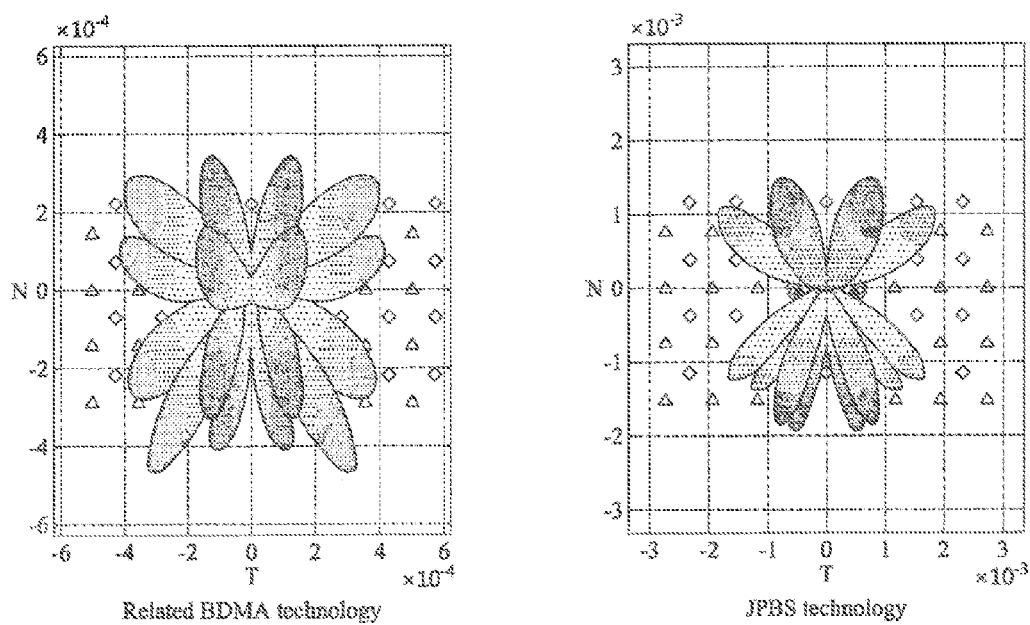
FIG. 11 illustrates an example of a beam pattern optimally designed by applying a convex optimization scheme to configure an identical beam sector to that of FIG. 10.
Figure 12:
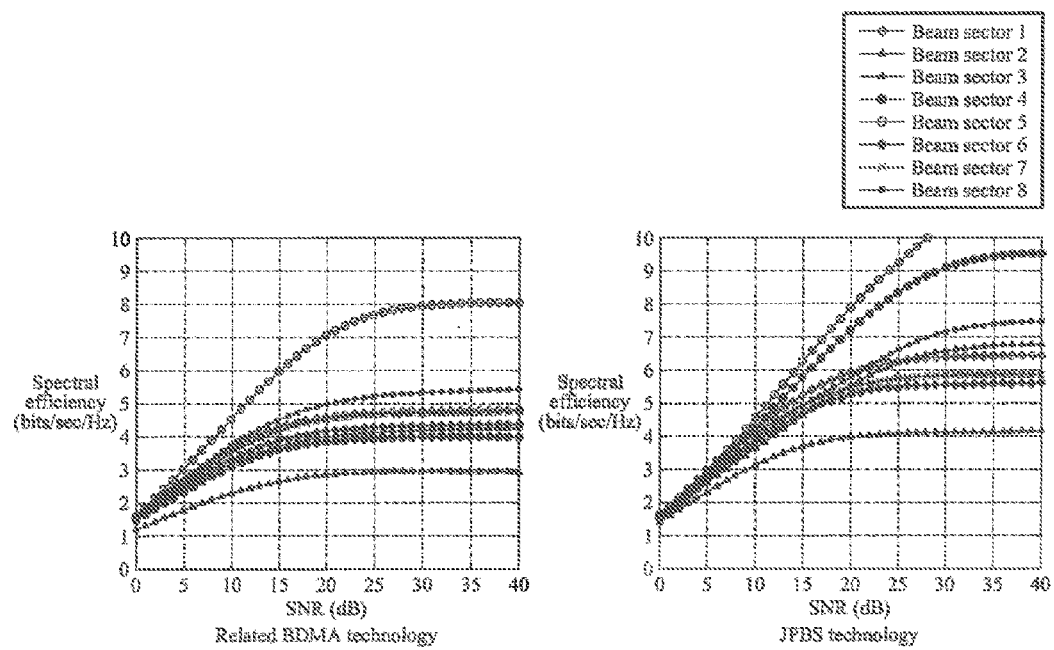
FIG. 12 illustrates an example of a MIMO capacity for each beam sector of FIG. 11.
Figure 13:
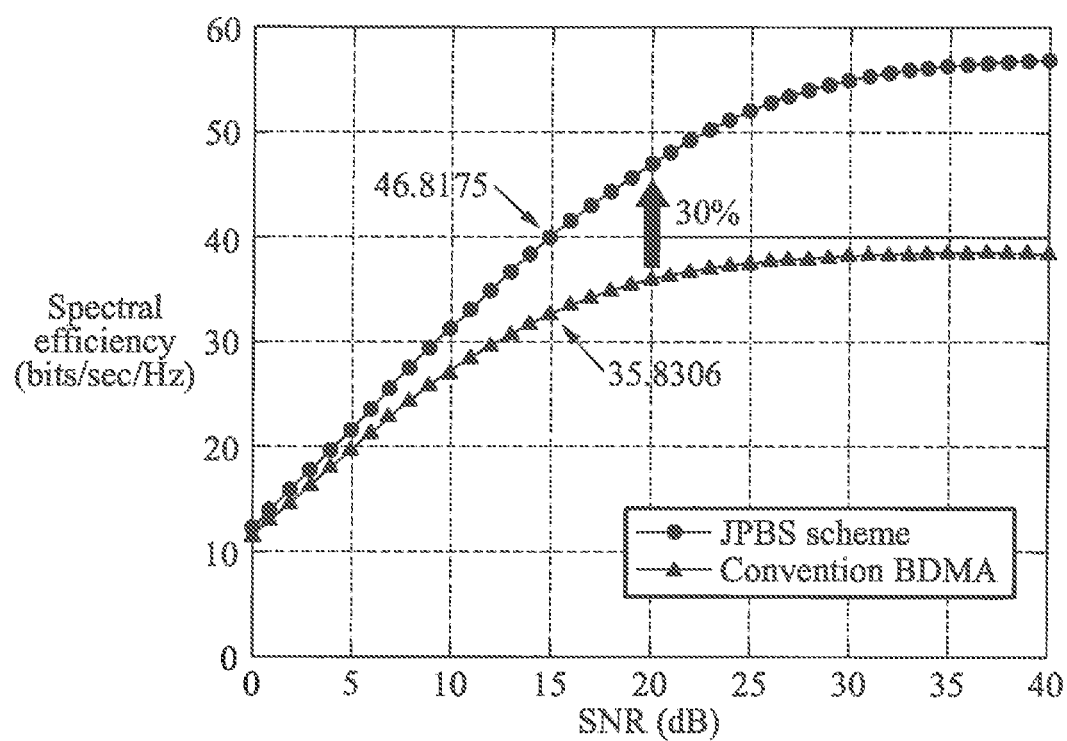
FIG. 13 illustrates an example of system capacity based on a signal-to-noise ratio (SNR).

FIG. 10 illustrates an example of configuring a beam sector based on JPBS technology and related BDMA technology. FIG. 11 illustrates an example of a beam pattern optimally designed by applying a convex optimization scheme to configure an identical beam sector to that of FIG. 10. FIG. 12 illustrates an example of a MIMO capacity for each beam sector of FIG. 11. FIG. 13 illustrates an example of system capacity based on a signal-to-ratio (SNR).

In FIG. 12, as an example, a MIMO capacity may be computed for each beam sector by applying a cluster channel model having a 10° angular spread and 10 rays to an azimuth and an elevation for each beam sector.

As illustrated in FIG. 12, MIMO channel capacities of all beam sectors may be significantly improved based on the JPBS technology when compared to the related BDMA technology. Also, as illustrated in FIG. 13, spectral efficiency may increase by 30% at a 20 dB reception SNR.

In the JPBS technology, an antenna radiation angle may be limited using a pattern antenna element, thereby reducing a probability that interference occurs in neighboring pattern beam sectors included in neighboring pattern sectors, respectively. Thus, the antenna radiation angle may be limited using the pattern antenna element to prevent an overlap between the neighboring pattern beam sectors included in the neighboring pattern sectors, which may lead to a reduction of an interference occurrence probability. Through this, higher capacity gain may be generated in the JPBS technology when compared to the related BDMA technology.

Since a radio frequency (RF) end complexity based on an analog beamformer of the related BDMS technology may be exactly the same as that of the JPBS technology, the JPBS technology may be turned out to be effective to acquire 30% spectral efficiency improvement effect by using the same antenna array space as that of the related BDMS technology.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A joint pattern beam sectorization method comprising:
    generating, in a service target region, pattern sectors by using a plurality of pattern antenna arrays wherein each pattern sector corresponding to one of the plurality of pattern antenna arrays, a radiation pattern of each pattern antenna array is different;
    dividing the each pattern sector into a corresponding plurality of pattern beam sectors through a beamforming using pattern antennas included a pattern antenna array corresponding to the each pattern sector; and
    propagating a signal within at least one of the pattern beam sectors, each propagated signal within the pattern beam sector having a corresponding pattern beam identification,
    wherein at least one pattern beam sector included in a first pattern sector of the pattern sectors does not overlap with at least one pattern beam sector included in a second pattern sector of the pattern sectors, the first pattern sector is located adjacent to the second pattern sector, and the at least one pattern beam sector in the first pattern sector is located adjacent to the at least one pattern beam sector in the second pattern sector, and
    wherein the plurality of pattern antenna arrays comprise a first antenna array corresponding to the first pattern sector and a second antenna array coresponding to the second pattern sector, and
    wherein each of a first pattern antennas included the first antenna array and each of a second pattern antennas included the second antenna array are grouped by arranging the first pattern antennas at a first interval and arranging the second pattern antennas at a second interval, and
    wherein the first interval and the second interval are a half-wave length($\lambda/2$), and
    wherein the corresponding pattern beam identification is incorporated in a secondary synchronization symbol of a downlink frame so as to be recieved by all terminal devices in a corresponding pattern beam sector.

2. The method of claim 1, wherein the pattern antennas included in each of the pattern antenna arrays are disposed at a predetermined interval.

3. The method of claim 1, wherein the generating of the pattern beam sectors comprises generating output signals to be transmitted to the pattern beam sectors generated in each of the pattern sectors through a beamforming of input signals and transmitting the output signals to the pattern beam sectors generated in each of the pattern sectors using the pattern antennas included in each of the pattern antenna arrays to provide the propagating signal.

4. A communication apparatus comprising:
    pattern antenna arrays, each including pattern antennas; and
    a beamformer, responsive to a downlink precoder and connected to the pattern antennas, to divide each pattern sector into a corresponding plurality of pattern beam sectors through a beamforming using pattern antennas included a pattern antenna array corresponding to the each pattern sector, each pattern beam sector having a corresponding pattern beam identification for signals propagating within the pattern beam sector, wherein the each pattern sector corresponding to one of the plurality of pattern antenna array,
    wherein each of the pattern antenna arrays has a different radiation pattern, at least one pattern beam sector included in a first pattern sector of the pattern sectors does not overlap with at least one pattern beam included in a second pattern sector of the pattern sectors, the first pattern sector is located adjacent to the second pattern sector, and the at least one pattern beam sector in the first pattern sector is located adjacent to the at least one pattern beam sector in the second pattern sector,
    wherein the pattern antenna arrays comprise a first antenna array corresponding to the first pattern sector and a second antenna array corresponding to the second pattern sector, and
    wherein each of a first pattern antennas included the first antenna array and each of a second pattern antennas included the second antenna array are grouped by arranging the first antennas at a first interval and arranging the second antennas at asecond interval, and
    wherein the first interval and the second interval are a half-wave length($\lambda/2$), and
    wherein the corresponding pattern beam identification is incorporated in a secondary sychronization symbol of a downlink frame so as to be recieved by all terminal devices in a corresponding pattern beam sector.

5. The apparatus of claim 4, wherein the beamformer generates output signals to be transmitted to pattern beam sectors generated in each of the pattern sectors through a beamforming of input signals, and transmits the output signals to the pattern beam sectors generated in each of the pattern sectors using the pattern antennas included in each of the pattern antenna arrays.

6. The apparatus of claim 4, wherein the pattern antennas included in each of the pattern antenna arrays are disposed at a predetermined interval.

* * * * *